US008576054B2

(12) United States Patent
Jacquet et al.

(10) Patent No.: US 8,576,054 B2
(45) Date of Patent: Nov. 5, 2013

(54) PULSED ELECTRICAL REMOTE CONTROL INTERFACE, EQUIPMENT AND SATELLITE COMPRISING SUCH AN INTERFACE

(75) Inventors: Bruno Jacquet, Villeneuve Tolosane (FR); Raoul Rodriguez, Bruguieres (FR); Michel Perrel, Villeneuve Tolosane (FR); Jean Maynard, Ramonville (FR); Emile Tonello, Saint-Lys (FR)

(73) Assignee: Thales, Neuilly sur Seine (FR)

( * ) Notice: Subject to any disclaimer, the term of this patent is extended or adjusted under 35 U.S.C. 154(b) by 882 days.

(21) Appl. No.: 12/704,457

(22) Filed: Feb. 11, 2010

(65) Prior Publication Data

US 2010/0211191 A1 Aug. 19, 2010

(30) Foreign Application Priority Data

Feb. 13, 2009 (FR) ...................................... 09 00677
Mar. 10, 2009 (FR) ...................................... 09 01096

(51) Int. Cl.
*G08C 19/16* (2006.01)
*G05B 11/01* (2006.01)
*G06F 13/00* (2006.01)

(52) U.S. Cl.
USPC .................... 340/12.18; 340/12.1; 340/12.22; 340/12.37; 710/34

(58) Field of Classification Search
None
See application file for complete search history.

(56) References Cited

U.S. PATENT DOCUMENTS

| | | | | |
|---|---|---|---|---|
| 3,678,392 | A * | 7/1972 | Houghton | 367/197 |
| 4,045,777 | A | 8/1977 | Mierzwinski et al. | |
| 4,682,092 | A * | 7/1987 | Pellegrino et al. | 318/696 |
| 6,829,310 | B1 | 12/2004 | Nasta et al. | |
| 7,545,211 | B2 | 6/2009 | Villemazet et al. | |
| 2004/0120291 | A1 | 6/2004 | Nasta et al. | |
| 2008/0092180 | A1 * | 4/2008 | Kim et al. | 725/63 |
| 2009/0219097 | A1 | 9/2009 | Rodriguez et al. | |

FOREIGN PATENT DOCUMENTS

EP 1026561 B1 4/2004

* cited by examiner

*Primary Examiner* — Ernest Unelus
*Assistant Examiner* — Ronald Modo
(74) *Attorney, Agent, or Firm* — Baker & Hostetler LLP

(57) ABSTRACT

A pulsed electrical remote control interface for an equipment item including a plurality of functions to be controlled includes at least a first command input associated with a first command line (TC-Type, TC-Type-plus, TC-Type-minus) for selecting at least one function (RF ON, RF OFF, ALC ON, ALC OFF, FCA UP, FCA DOWN, GCA UP, GCA DOWN, SCA UP, SCA DOWN, INHIBIT) to be performed from the plurality of functions and at least one second command input associated with a second command line (EXE, EXE-UP-ON, EXE-DOWN-OFF) for executing the selected function, each command input being associated with an outbound pulsed command line and a return line, the return line possibly being shared with a number of outbound lines. Applicable to the control of any kind of equipment that includes a large number of functions and requires a large number of pulsed command signals, notably in the field of satellite communication systems.

7 Claims, 5 Drawing Sheets

PULSED ELECTRICAL REMOTE CONTROL INTERFACE, EQUIPMENT AND SATELLITE COMPRISING SUCH AN INTERFACE

CROSS-REFERENCE TO RELATED APPLICATIONS

This application claims priority to foreign France patent application No, 0900677, filed on Feb. 13, 2009, and to foreign France patent application No. 0901096, filed on Mar. 10, 2009, the disclosures of which are hereby incorporated by reference in their entirety.

FIELD OF THE INVENTION

The present invention relates to a pulsed electrical remote control interface, an equipment item and a satellite including such an interface. It applies to the control of any kind of equipment that includes a large number of functions and requires a large number of pulsed command signals, such as, for example, linearized driver limiter amplifiers LDLA used in satellite communication systems.

BACKGROUND OF THE INVENTION

In satellite communication systems, some equipment such as the power amplification subsystems are becoming increasingly complex with a growing need for remote control signals. For example, the DLA (driver limiter amplifier) function and the power flexibility function of the travelling wave tube amplifiers TWTA require a growing number of pulsed commands for their configuration. This need for additional commands does not involve any complication for remote controls that have an interface of serial type, such as a 16-bit serial command for example, but is very detrimental for pulsed remote controls because they require additional command lines. In practice, currently, controlling an LDLA entails applying ten pulsed commands via ten dedicated interfaces. This large number of commands increases the complexity of the remote control systems and affects the cost and weight budget of the equipment and of the electrical leads that are fitted on the platforms of the satellites as much as in the current satellite applications; for each function to be controlled, each electrical control interface comprises a wired link comprising an outbound command line and an associated return line, but it is often accepted that several outbound command lines have one command return line. Furthermore, the current electrical control interfaces have the additional drawback of not allowing a command sent in error to be cancelled.

SUMMARY OF THE INVENTION

The aim of the invention is to resolve these problems and propose a pulsed electrical remote control interface that makes it possible to limit the number of command lines regardless of the number of functions to be driven and that makes it possible to cancel a current command.

For this, the invention relates to a pulsed electrical remote control interface for an equipment item including a plurality of functions to be controlled, said electrical interface comprising at least a first command input associated with a first command line for selecting at least one function to be performed from the plurality of functions and at least a second command input associated with a second command line for executing the selected function, each command input being associated with an outbound pulsed command line and a return line, the return line capable of being shared with a number of outbound lines.

Advantageously, each function to be controlled is defined by a predetermined number of consecutive command pulses.

According to one embodiment of the invention, the number of command pulses is different for different functions and the electrical interface has only two command inputs respectively dedicated to selecting at least one function and executing the selected function.

According to another embodiment of the invention, the number of command pulses is identical for functions of the same type corresponding to a first direction or to a second direction of execution that are different and the electrical interface includes at least one selection command input and two execution command inputs respectively dedicated to the execution of the selected function in the first direction and in the second direction.

According to another embodiment of the invention, the electrical interface includes two selection command inputs and two execution command inputs, the two selection command inputs being respectively dedicated to increasing and reducing a number of pulses counted, the number of pulses counted corresponding to the selection of the function.

On the execution command inputs, each command for executing a function comprises a single pulse. In this case, advantageously, the performance of the same function several times in succession corresponds to the emission of a number of consecutive pulses on the same command input.

Advantageously, the execution command pulse for a function selected by the selection command inputs is emitted on an execution command input after the emission of the pulses for selecting the function on a selection command input.

The invention also relates to an equipment item that includes an electrical remote control interface according to the invention and a satellite that includes at least one equipment item according to the invention.

BRIEF DESCRIPTION OF THE DRAWINGS

Other particular features and advantages of the invention will become clearly apparent hereinafter from the description given by way of purely illustrative and nonlimiting example, with reference to the appended diagrammatic drawings which represent.

DETAILED DESCRIPTION

Figure 1:
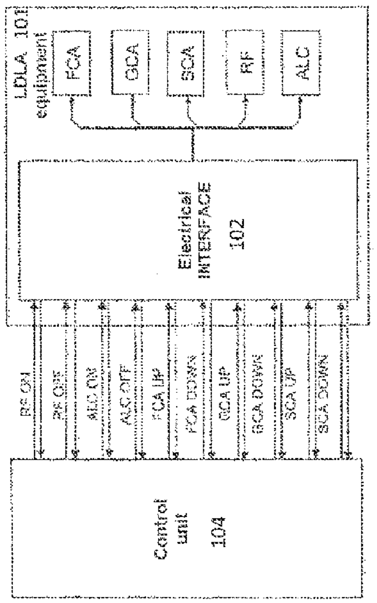
FIG.1 (Prior art)
FIG. 1: an exemplary electrical remote control interface for an equipment item, according to the prior art.
Figure 2:
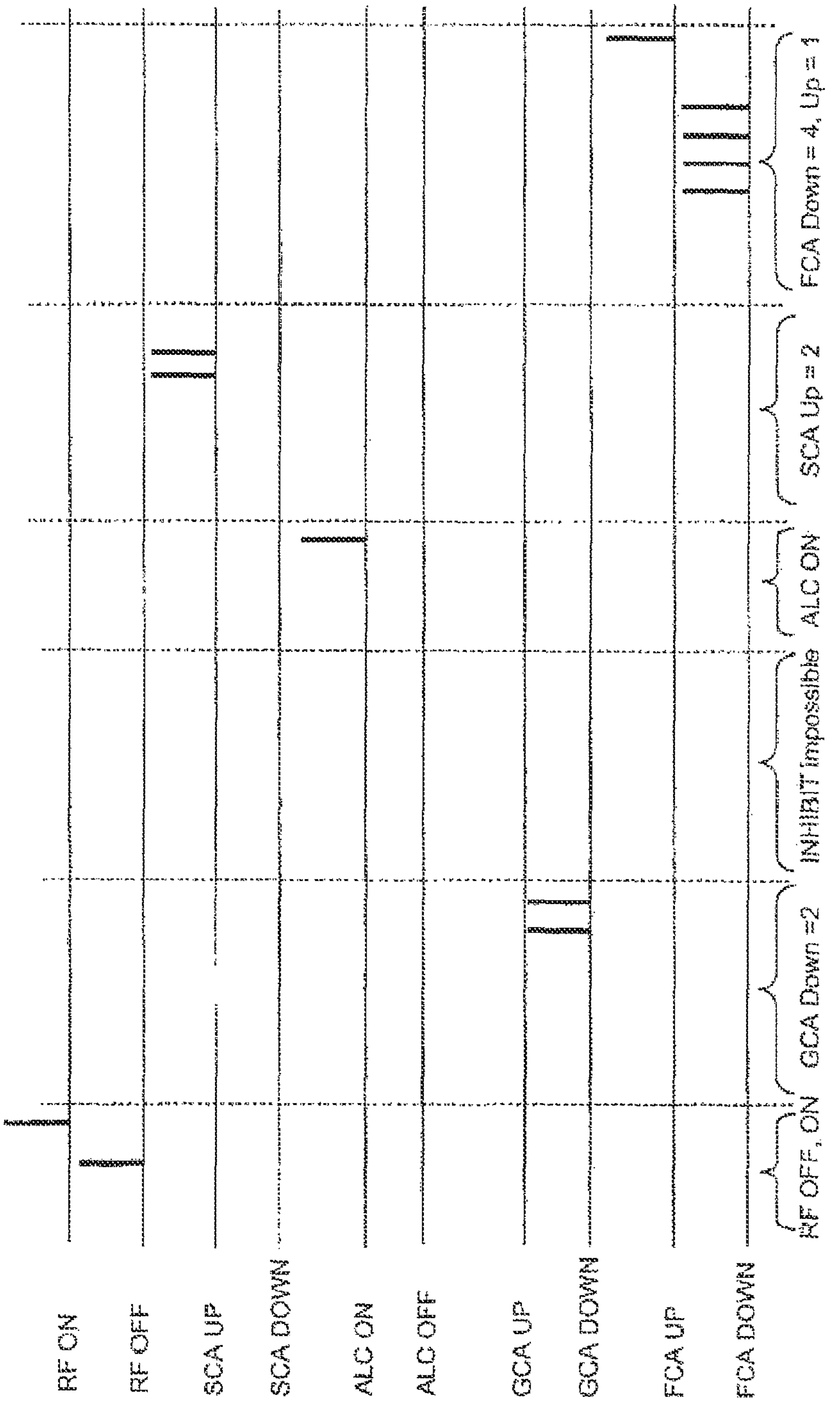
FIG.2 (PRIOR ART)
FIG. 2: an exemplary sequence of pulsed command signals for an equipment item, according to the prior art.

FIG. 1 represents an exemplary remote control interface 102 for an equipment item 101 onboard a satellite (not shown), according to the prior art. The interface comprises ten command inputs corresponding to ten pulsed commands, each command input being associated with an outbound pulsed command line and a return line, as indicated by pairs of arrows. However, for some applications, the return line may be common to a number of outbound lines. In this example, the command inputs of the remote control interface 102 are linked to a control unit 104, for example a computer (not shown), onboard a satellite and the output signals from the control interface 102 are transmitted to the equipment item 101 comprising, for example, a linearized driver limiter amplifier LDLA. To control the linearized driver limiter amplifier LOLA, two command inputs RE ON and RF OFF are needed to respectively control the emission of a radiofrequency signal and stop this emission. Similarly, two command inputs ALC ON and ALC OFF (ALC standing for automatic level control) are needed to execute the commands of the ALC function in ALC mode corresponding to the ALC ON command or in fixed gain mode FGM, corresponding to the ALC OFF command and three times two command inputs UP, DOWN are needed to execute each of the gain commands FCA UP and FCA DOWN (FCA standing for flux control attenuator), adjust the amplitude GCA UP and GCA DOWN (GCA standing for gain control attenuator) and control a linearizer SCA UP and SCA DOWN (SCA standing for setting control attenuator). Each function requires two specific command inputs respectively associated with two specific command lines making it possible to determine the direction of execution of the selected function, that is to say, determine whether the function must be activated in a first direction ON or UP or in a second direction OFF or DOWN. The greater the number of functions to be performed, the greater the number of command inputs and command lines, the number of command lines being twice the number of functions to be performed. Furthermore, this system does not make it possible to cancel a command; when the command pulse is emitted, the command is systematically executed. As represented in FIG. 2, the execution of each function is performed by the emission of a pulse to the command input corresponding to this function and the emission of several successive pulses to one and the same command input corresponding to the execution of the same function several times in succession. Furthermore, in case of an error, after the emission of a pulse to one of the command inputs, there is no possibility of cancelling the execution of that function since each pulse emitted to a command input triggers the execution of the function corresponding to that command input. The sequencing represented in FIG. 2 corresponds to the execution of the plurality of the following different types of functions: RF-OFF, RF-ON, GCA-DOWN (reduction=2), ALC-ON, SCA-UP (increase=2), FCA-DOWN (reduction=4), FCA-UP (increase=1). The INHIBIT function corresponding to the cancellation of a command pulse that has already been emitted is impossible.

To limit the number of command inputs and associated command lines regardless of the number of functions to be driven and allow a command to be cancelled in the case of an error, the invention comprises, in a first and a second embodiment, in allocating to one and the same command input a number of pulses specific to each function, which makes it possible, by a count of the number of pulses emitted, to select the type of function to be performed by using the same command line regardless of the function selected and use only one or two other additional command inputs to launch the execution of the selected function.

Alternatively, to reduce the number of pulses emitted to the command input for selecting the type of function, it is also possible to use additional selection command inputs as indicated by way of example in the third embodiment of the invention.

Figure 3:
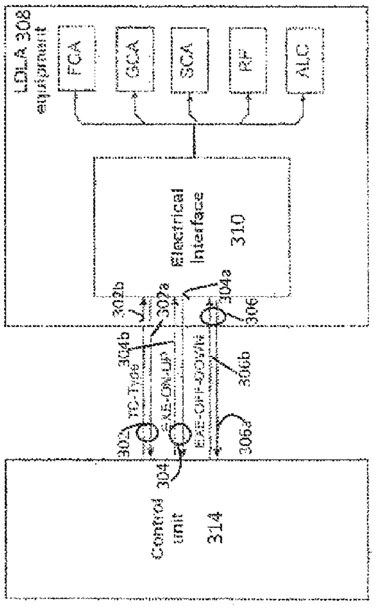
FIG. 3: an exemplary electrical remote control interface for the equipment of FIG. 1, comprising three command inputs, according to a first embodiment of the invention.

FIG. 3 represents an exemplary electrical remote control interface 310 for the same LOLA equipment 308 as that of FIG. 1, according to a first embodiment of the invention. The electrical interface 310 comprises a maximum of three command inputs on command input lines 302, 304, 306, each command input being associated with respective outbound pulsed command lines 302*a*, 304*a*, 306*a* and return lines 302*b*, 304*b*, 306*b*.

The first command line 302, called TC-Type, applied to the first command input is made up of signals intended to select at least one type of function to be performed from the plurality of functions that are possible, RF, ALC, FCA, GCA, SCA. The five types of command functions for the LOLA equipment 308 are complemented by a sixth function, called INHIBIT command, corresponding to the cancellation of the last command emitted and not yet executed.

The second command line 304, called EXE-ON-UP, applied to a second command input, comprises a signal for activating the selected function in a first direction, ON or UP. The third command line 306, called EXE-OFF-DOWN, applied to the third command input comprises a signal for activating the selected function in a second direction, OFF or DOWN. The signal for activating a function selected by the first command line 302 (TO-Type) is emitted over the second or third command line 304, 306 (EXE-ON-UP, EXE-OFF-DOWN) after the emission of the function selected on the first command line 302 (TC-Type).

Figure 4:
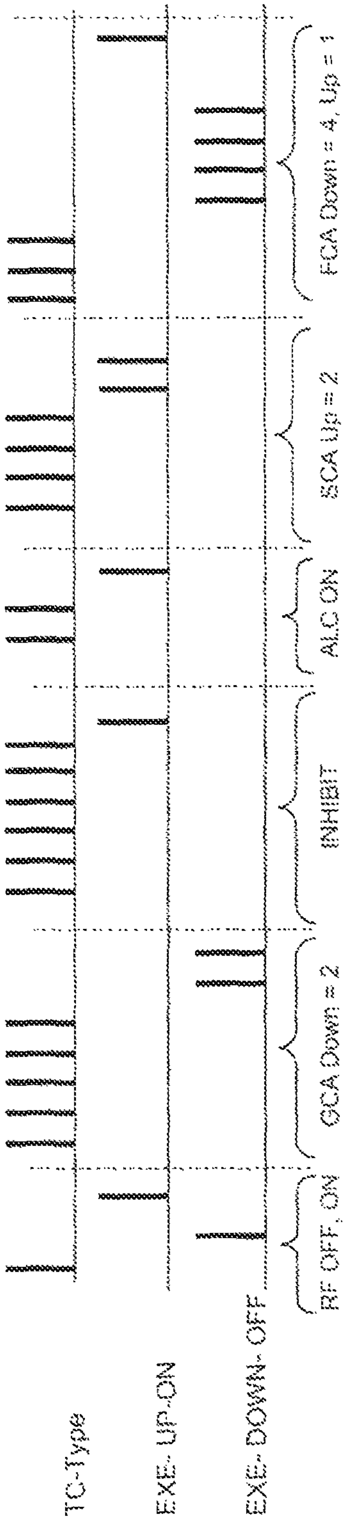
FIG. 4: an exemplary sequence of pulsed command signals for the equipment of FIG. 1, corresponding to the performance of the same successive functions as in FIG. 2, according to the first embodiment of the invention.

As represented in FIG. 4, according to this first embodiment of the invention, each type of function is defined by a predetermined number of consecutive command pulses, this number of pulses being different for each type of function. Thus, a given number of consecutive pulses has a corresponding single type of function to be executed. The number of pulses on the TC-Type line 302 is unlimited and is chosen according to the requirements and constraints such as, for example, reliability constraints and/or constraints on the number of functions to be controlled. The width of the pulses and the interval between the pulses are chosen freely and are limited only by the operational or technological constraints. In this example, the selection of the RF ON/OFF function corresponds to a command signal comprising a single pulse, the selection of the ALC ON/OFF function corresponds to a signal with two consecutive pulses, and the selections of the FCA, SCA and GCA functions correspond to command signals respectively comprising three, four and five consecutive pulses. The selection of the INHIBIT function corresponds to a number of pulses greater than the number of pulses of all the other commands. For example, in the case of FIG. 4, the selection of the INHIBIT function corresponds to a signal comprising a number of pulses greater than or equal to 6 consecutive pulses.

The activation signals EXE-ON-UP and EXE-OFF-DOWN for the selected functions can, for example, comprise a single pulse for the ON or OFF direction commands and for the UP and DOWN direction commands. In this case, the performance of the same function several times in succession corresponds to the emission of several consecutive pulses over the same line 304 or 306 (EXE-ON-UP or EXE-OFF-DOWN). For example, in FIG. 4, the two consecutive pulses on the EXE-ON-UP line 304 corresponding to the TC-Type SCA function mean that the SCA function must be executed twice in the UP direction which corresponds to an increase by two units of the SCA function. The delimiting of the commands applied to the TC-Type command line 302 is then performed by the first pulse which arrives on the EXE-ON-UP line 304 or EXE-OFF-DOWN line 306 after the selection of the function on the TC-Type line 302. The count of the pulses emitted to the selection command input is performed by the electrical remote control interface 310 and is reset after the execution of each function.

In one and the same TC-Type command line 302, this protocol makes it possible to sequence, at will, a plurality of executions of different types of functions, as represented for example in FIG. 4. The sequencing of the functions represented in FIG. 4 is the same as that represented in FIG. 2, apart from the INHIBIT function, and corresponds to the following functions: RF-OFF RF-ON, GCA-DOWN (reduction=2), INHIBIT (cancellation of the current command), ALC-ON, SCA-UP (increase=2), FCA-DOWN (reduction=4), FCA-UP (increase=1).

According to this protocol, the TC-Type command line 302 does not make it possible to distinguish between the activation commands of ON and OFF type, or between the execution commands of UP and DOWN type of the various selected functions, which is why it is necessary to add to the electrical control interface 310 two additional command inputs respectively dedicated to executing the function selected in the first direction ON/UP or in the second direction OFF/DOWN and thus making it possible to determine the direction in which the selected function must be executed.

Figure 5:
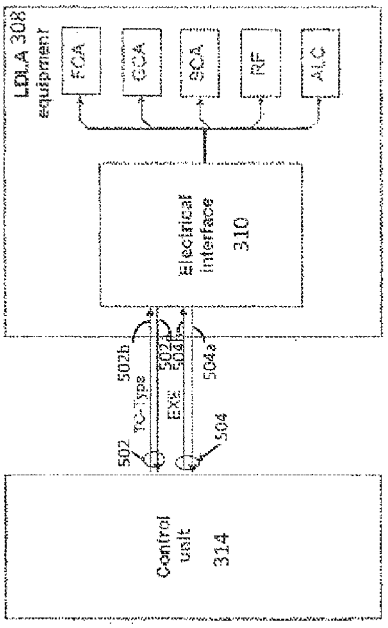
FIG. 5: an exemplary electrical remote control interface for the equipment of FIG. 1, comprising two command inputs, according to a second embodiment of the invention.

According to a second embodiment of the invention represented in FIG. 5, the electrical remote control interface 310 of the same LDLA equipment 308 as that of FIG. 1 has only two command inputs on command input lines 502 and 504, each command input being associated with outbound pulsed command lines 502*a*, 504*a* and return lines 502*b*, 504*b*, the return lines 502*b*, 504*b* capable of being common to two outbound lines 502*a*, 504*a*. The first command line 502, called TC-Type, corresponds to the selection of a type of function, the directions ON and OFF and the directions UP and DOWN associated with each function being considered as different types of functions. The second command line 504, called EXE, corresponds to the launching of the execution of the selected type of function.

Figure 6:
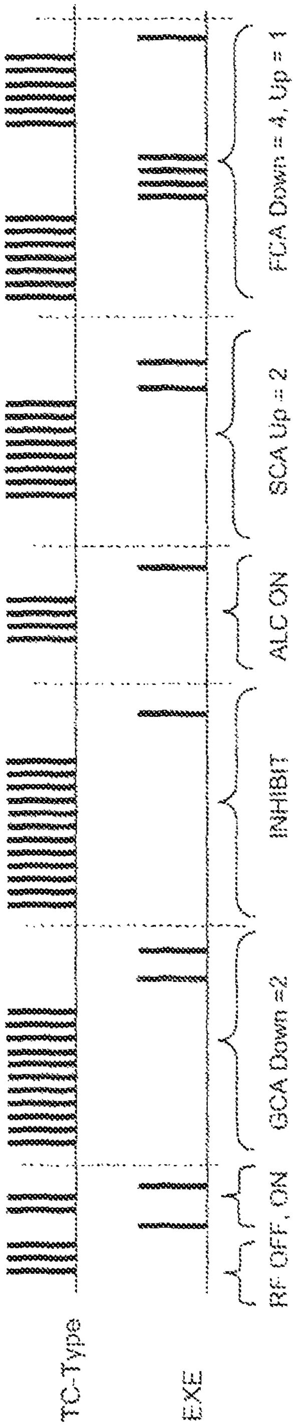
FIG. 6: an exemplary sequence of pulsed command signals for the equipment of FIG. 1, corresponding to the performance of the same successive functions as FIGS. 2 and 4, according to the second embodiment of the invention.

FIG. 6 shows an exemplary sequencing of the command signals corresponding to the performance of several successive types of functions, according to the second embodiment of the invention. In this example, the selections of the RF ON and RF OFF functions correspond to command signals respectively comprising two consecutive pulses and three consecutive pulses, the selections of the ALC ON and ALC OFF functions correspond respectively to a signal with four consecutive pulses and to a signal with five consecutive pulses, and the selections of the functions FCA-UP, FCA-DOWN, SCA-UP, SCA-DOWN, GCA-UP, GCA-DOWN correspond to command signals respectively comprising six to eleven consecutive pulses. The ten types of command functions of the LOLA equipment 308 are complemented with an eleventh function, corresponding to an INHIBIT command, dedicated to cancelling the last command emitted and not yet executed.

The sequencing represented in FIG. 6 is identical to that represented in FIG. 4 and corresponds to the following functions: RF-OFF (once), RF-ON (once), GCA-DOWN (reduction=2), INHIBIT (cancellation of the current command), ALC-ON (once), SCA UP (increase=two), FCA-DOWN (reduction=4), FCA-UP (increase=1).

The command signals for executing successive types of functions can, for example, comprise a single pulse. In this case, the performance of the same function several times in succession corresponds to the emission of several consecutive pulses over the same EXE command line 504. The delimiting of the commands applied to the TC-Type command line 502 is then performed by the first pulse which arrives on the EXE line 504 after the activation of the function on the TC-Type line 502. The count of the pulses emitted to the selection command input TC-Type is performed by counting means, not represented, internal to the electrical remote control interface 310 and is reset after the execution of each function.

This second embodiment of the invention is therefore the embodiment that has the fewest command inputs but it is less flexible in use than the first embodiment of the invention because, in the case where the same function must be executed successively in a first direction and then in a second direction, the type of function to be executed must be indicated twice in succession on the TC-TYPE command input.

Figure 7:
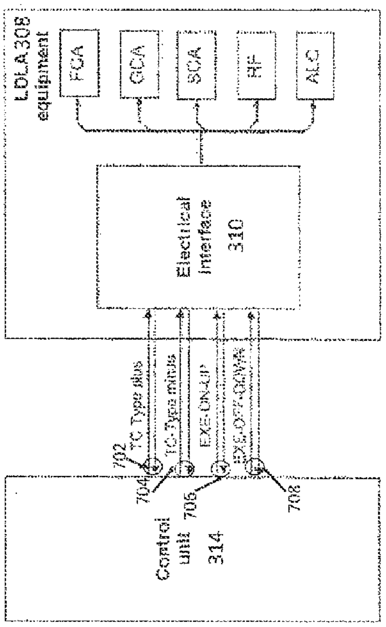
FIG. 7: an exemplary electrical remote control interface for the equipment of FIG. 1, comprising four command inputs, according to a third embodiment of the invention.

Although the first two embodiments of the invention present a minimal number of command inputs, in some applications, it may be desirable to add additional command inputs. According to a third embodiment shown in FIG. 7, the electrical remote control interlace 310 for the same LDLA equipment 308 as that of FIG. 1 comprises four command inputs. The first two command lines 702 and 704, respectively called TC-Type-plus and TC-Type-minus, applied to the first two command inputs comprise signals intended to select at least one type of function to be performed from the plurality of functions that are possible: RF, ALC, FCA, OCA, SCA, INHIBIT. The last two command lines 706 and 708 (EXE-ON-UP and EXE-OFF-DOWN), respectively applied to a third and a fourth command input, comprise signals for activating the selected function in a first direction ON or UP or in a second direction OFF or DOWN. According to this third embodiment of the invention, the count of the pulses emitted to the selection command inputs is not reset after the execution of each function but is continued with the incrementing or decrementing of the count depending on the following type of function to be executed. Each function applied to the first command line 702 (TC-Type-plus) makes it possible to increment the count of the pulses and each pulse applied to the second command line 704 (TC-Type-minus) makes it possible to decrement the count of the pulses. When the number of pulses counted corresponds to that of the function to be executed, one or more pulses are emitted to one of the command inputs dedicated to the execution of that function.

Figure 8:
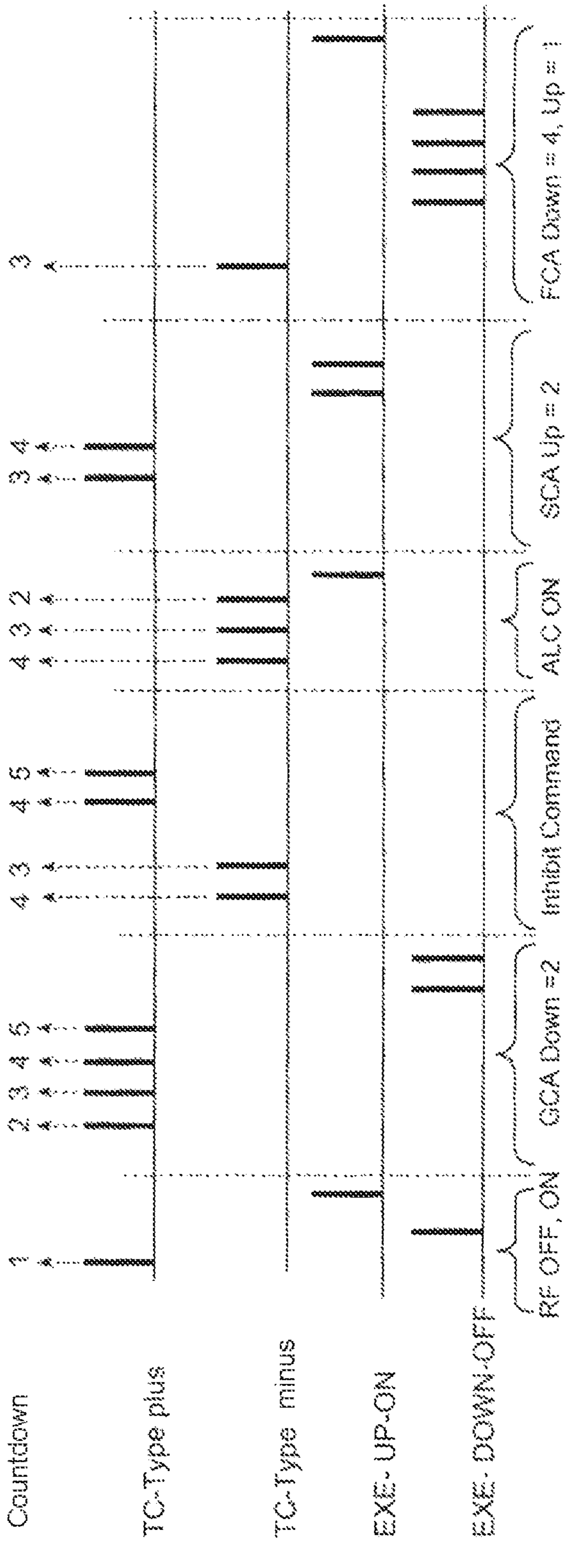
FIG. 8: an exemplary sequence of pulsed command signals for the equipment of FIG. 1, corresponding to the performance of the same successive functions as FIGS. 2, 4 and 6, according to the third embodiment of the invention.

FIG. 8 shows an exemplary sequencing of the command signals corresponding to the performance of several successive types of functions, according to the third embodiment of the invention. The sequencing of the different types of functions is identical to that represented in FIGS. 4 and 6 and corresponds to the following functions: RF-OFF (once), RF-ON (once), GCA-DOWN (reduction=2), INHIBIT (cancellation of the current command), ALC-ON (once), SCA-UP (increase=two), FCA-DOWN (reduction=4), FCA-UP (increase=1). The operation of the execution lines for the two command inputs EXE-ON-UP and EXE-DOWN-OFF and the number of pulses allocated to each type of function are identical to those described in conjunction with FIG. 4, except for the INHIBIT function. In the exemplary embodiment of FIG. 8, the number of pulses of the INHIBIT function is variable and depends on the number of pulses entered in error on one of the command inputs TC-Type-plus or TC-Type-minus and that are to be removed or added by the counting means. Alternatively, the INHIBIT function can be performed in the same way as in the embodiments of FIGS. 4 and 6, by assigning this function a number of pulses greater than that assigned to all the other functions. Another difference lies in the selection of the different types of function that is performed through the intermediary of two command lines instead of just one. Thus, to perform the first two functions RE-OFF, RF-ON, a pulse is applied to the first selection command line 702 (TC-Type-plus) to increment the number of pulses counted down to the value 1 then a pulse is emitted to the execution command input EXE-OFF-DOWN followed by a pulse to the execution command input EXE-ON-UP. The performance of the next function GCA-DOWN=2 is handled by the application of four successive pulses to the first selection command line 702 (TC-Type-plus) to increment the count of the pulses from the value 1 to the value 5, then a pulse is emitted twice in succession to the execution command input EXE-OFF-DOWN to perform the OCA-DOWN function twice. The two pulses then emitted over the second selection command line 704 (TC-Type-minus) that have decremented the count of the pulses from the value 5 to the value 3 are neutralized by two pulses that are then emitted over the first selection command line 702 (TC-Type-plus), which corresponds to an INHIBIT function. No execution pulse is therefore needed to perform the INHIBIT function according to this exemplary embodiment. Since the number of pulses counted down again has the value 5, it must be decremented by three units to drop to the value 2 and perform the following function ALC-ON, then incremented by two units to reach the value 4 and perform the function SCA-UP=2, and finally be decremented once again to reach the value 3 and perform the functions FCA-DOWN=4 and FCA-UP=1.

Although the invention has been described in conjunction with particular embodiments and for a particular equipment item, it is obvious that it is by no means limited and that it includes all the technical equivalents of the means described and their combinations, provided that the latter fall within the scope of the invention.

The invention claimed is:

1. A pulsed electrical remote control interface for an equipment item including a plurality of functions to be controlled, the electrical interface comprising:

at least a first command input associated with a first command line for selecting at least one function to be performed from the plurality of functions and at least a second command input associated with a second command line for executing the selected function, each command input being associated with an outbound pulsed command line and a return line, the return line capable of being shared with a number of outbound lines, wherein each function to be controlled is defined by a predetermined number of consecutive command pulses, wherein the number of command pulses is identical for functions of the same type corresponding to a first direction or to a second direction of execution that are different and wherein the electrical interface includes at least one selection command input and two execution command inputs respectively dedicated to the execution of the selected function in the first direction and in the second direction.

2. The electrical interface according to claim 1, including two selection command inputs and two execution command inputs, the two selection command inputs being respectively dedicated to increasing and reducing a number of pulses counted, the number of pulses counted corresponding to the selection of the function.

3. The electrical interface according to claim 1, wherein, on the two execution command inputs, each command for executing a function comprises a single pulse.

4. The electrical interface according to claim 3, wherein the performance of the same function several times in succession corresponds to the emission of a number of consecutive pulses on the same command input.

5. The electrical interface according to claim 3, wherein the execution command pulse for a function selected by the selection command inputs is emitted on an execution command input after the emission of the pulses for selecting the function on a selection command input.

6. An equipment item including an electrical remote control interface according to claim 1.

7. A satellite including at least one equipment item according to claim 6.

* * * * *